(12) United States Patent
Eden et al.

(10) Patent No.: US 11,967,314 B2
(45) Date of Patent: Apr. 23, 2024

(54) AUTOMATIC GENERATION OF A CONTEXTUAL MEETING SUMMARY

(71) Applicant: Capital One Services, LLC, McLean, VA (US)

(72) Inventors: Grant Eden, McLean, VA (US); Jeremy Goodsitt, McLean, VA (US); Austin Walters, McLean, VA (US); Anh Truong, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 316 days.

(21) Appl. No.: 17/517,644

(22) Filed: Nov. 2, 2021

(65) Prior Publication Data

US 2023/0135071 A1    May 4, 2023

(51) Int. Cl.
| | |
|---|---|
| G10L 15/183 | (2013.01) |
| G06N 20/00 | (2019.01) |
| G10L 17/06 | (2013.01) |

(52) U.S. Cl.
CPC ............ G10L 15/183 (2013.01); G06N 20/00 (2019.01); G10L 17/06 (2013.01)

(58) Field of Classification Search
CPC ........ G10L 15/183; G10L 17/06; G06N 20/00
See application file for complete search history.

(56) References Cited

U.S. PATENT DOCUMENTS

| | | | | |
|---|---|---|---|---|
| 10,743,107 | B1* | 8/2020 | Yoshioka | ............. H04R 29/006 |
| 2003/0028384 | A1* | 2/2003 | Kemp | ..................... G10L 17/26 |
| | | | | 704/275 |
| 2008/0126646 | A1* | 5/2008 | Sakanaka | ............. H04L 67/025 |
| | | | | 710/119 |
| 2014/0114655 | A1 | 4/2014 | Kalinli-Akbacak | |
| 2019/0295545 | A1* | 9/2019 | Andreas | ............. G10L 15/1815 |
| 2019/0303024 | A1* | 10/2019 | Iwai | ........................ G06F 3/061 |
| 2020/0090661 | A1 | 3/2020 | Ackerman et al. | |
| 2021/0104245 | A1* | 4/2021 | Aguilar Alas | .......... G10L 15/16 |
| 2021/0256309 | A1* | 8/2021 | Huth | ................... G06F 18/2148 |

(Continued)

FOREIGN PATENT DOCUMENTS

CN          110442867 A          11/2019

OTHER PUBLICATIONS

Byun, Multi-Modal Emotion Recognition Using Speech Features and Text-Embedding, 2021, Applied Sciences, whole document (Year: 2021).*

(Continued)

*Primary Examiner* — Sonia L Gay
(74) *Attorney, Agent, or Firm* — Perkins Coie LLP

(57) ABSTRACT

Systems and methods are disclosed herein for building contextual transcripts. A computing system may receive a textual transcript of a meeting that contains a variety of statements made by various attendees of the meeting, select the first statement made during the meeting, and determine which meeting attendee made the statement. A machine learning model corresponding to the particular attendee that has been trained using previously received statements by the particular attendee may be used on the utterance to determine the tone of the utterance. That tone may be recorded within the transcript and this process may be repeated for each utterance to build a contextual transcript.

17 Claims, 9 Drawing Sheets

(56) References Cited

U.S. PATENT DOCUMENTS

| | | |
|---|---|---|
| 2021/0264921 A1 | 8/2021 | Reece et al. |
| 2021/0304107 A1* | 9/2021 | Fink ................. G06Q 10/06398 |
| 2022/0292346 A1* | 9/2022 | Mimassi ................. G06F 40/30 |
| 2023/0059674 A1* | 2/2023 | Kim ....................... G06N 20/20 |

OTHER PUBLICATIONS

Extended European Search Report issued in corresponding European Application No. 22204867.0 dated Jan. 16, 2023 (4 pages).

* cited by examiner

| User Identifier | Tonal Machine Learning Model Identifier | Directional Machine Learning Model Identifier |
|---|---|---|
| User_1 | Tonal_Machine_Learning_Model_1 | Model_1 |
| User_2 | Tonal_Machine_Learning_Model_2 | Model_1 |
| User_3 | Tonal_Machine_Learning_Model_3 | Model_1 |
| User_4 | Tonal_Machine_Learning_Model_4 | Model_1 |
| User_5 | Tonal_Machine_Learning_Model_5 | Model_1 |

FIG. 2

| Utterance Identifier | Speaker Identifier | Utterance | Tone |
|---|---|---|---|
| Utterance_1 | Speaker_1 | "We need to close this deal!" | Assertive |
| Utterance_2 | Speaker_2 | "Our sales figures were higher than expected!" | Excited |
| Utterance_3 | Speaker_3 | "What if the deal falls through?" | Concerned |
| Utterance_4 | Speaker_1 | "The company will get through this hard time." | Bold |
| Utterance_5 | Speaker_4 | "Lets not spend too much of the budget this early." | Cautious |

FIG. 5

| Utterance Identifier | Speaker Identifier | Utterance | Tone | Direction |
|---|---|---|---|---|
| Utterance_1 | Speaker_1 | "We need to close this deal!" | Assertive | All |
| Utterance_2 | Speaker_2 | "Our sales figures were higher than expected!" | Excited | Speaker_1 |
| Utterance_3 | Speaker_3 | "What if the deal falls through?" | Concerned | Speaker_2 |
| Utterance_4 | Speaker_1 | "The company will get through this hard time." | Bold | Speaker_3 |
| Utterance_5 | Speaker_4 | "Let's not spend too much of the budget this early." | Cautious | All |

FIG. 6

AUTOMATIC GENERATION OF A CONTEXTUAL MEETING SUMMARY

BACKGROUND

Enterprises hold a plethora of meetings, where participants discuss various matters relating to the business of the enterprise. These meetings may be recorded in the form of a textual transcript to quickly recall what was spoken and what took place at these meetings. However, in many instances, these transcripts may not provide the reader with a full understanding of how the meeting actually unfolded. A human reader may review the meeting transcript and make various assumptions about the meeting that could be false. For example, a human reader may review a statement from the transcript and infer that the speaker is angry, whereas the speaker may just be taking charge as an authority figure. Various ways to solve this issue exist today. For example, one way to solve this issue may include making an audio/visual recording of the meeting. However, this may not be ideal because the amount of resources to make and store potentially hundreds of recordings per day may become prohibitive for particularly large enterprises. In addition, privacy concerns may need to be understood and overcome, if recordings are to be stored. Thus, currently, to infer the context of a meeting, someone attending the meeting has to observe and record its context. Afterwards, that person must go through the meeting transcript which may take a number of hours (e.g., 3 hours, 4 hours, etc.) and add context information to the transcript, assuming the person can accurately recall or has recorded each attendee's tone. That person will then need to encapsulate the background context into the transcript. This process is both resource and time intensive, thus it is inefficient.

SUMMARY

With advances in computer technology, e.g., machine learning technologies, inferring context of utterances detected during a meeting may be performed automatically by a computer system. That context information may then be stored with a transcript of the meeting. One advantage of this process is that this process is more efficient, and the result is often more accurate than having a person read through the transcript and record the context of each utterance manually within the transcript. In particular, a machine learning model corresponding to the particular attendee that has been trained using previously received statements by the particular attendee may be used on an utterance to determine a tone of the utterance. That tone may then be recorded within the transcript. This process may be repeated for each utterance to build a contextual transcript.

Therefore, methods and systems are described herein for improving meeting transcript content by providing background context within the transcript itself. For example, a context detection system may be used to perform the actions for providing background context within a transcript. The context detection system may receive a textual transcript of a meeting. The textual transcript may include a number of utterances for the users attending the meeting. The transcript may be in the form of an electronic file (e.g., a .doc or a .docx file), and may contain various statements from a variety of attendees present at the meeting. In some embodiments, instead of receiving the transcript of the meeting, the context detection system my perform operations on the fly (e.g., as utterances are being received).

In some embodiments, the transcript may be received from another system. Thus, the context detection system may generate the transcript on one computing device and transmit the transcript to another computing device. When the transcript is received, the context detection system may iterate through each utterance of the transcript (e.g., each statement) to determine context of each of those utterances. Thus, the context detection system may select a first utterance within the transcript. After selection, the context detection system may determine a user that is associated with the first utterance. For example, the system may match each utterance with a corresponding user using voice data that was harvested from prior meetings or using voice data stored within the context detection system (e.g., a voice print).

The context detection system may select a machine learning model associated with a specific user from a multitude of machine learning models (e.g., where each machine learning model is associated with a particular user). That is, each user may have a corresponding machine learning model that was trained using utterances of that particular user. The selected machine learning model may then determine a corresponding tone associated with a particular user's utterance. For example, each machine learning model may have been trained using a training set of utterances from past meetings to increase its accuracy. In some embodiments, the machine learning model may be trained using a training set that includes meeting data for each user from other meetings that the user attended. In other embodiments, a training set may include user voice data from outside the enterprise.

The context detection system may then input the utterance data associated with the first utterance into the first machine learning model to obtain a tone associated with the first utterance. The utterance data may include voice characteristics that are associated with the first utterance along with textual data of the first utterance. In some embodiments, the context detection system may vectorize the textual data and the voice characteristics into a vector representation generating an input vector, and may input the input vector into the first machine learning model (sometimes referred to as a tonal machine learning model) to obtain a tone associated with the utterance. The tonal machine learning model may be trained with training data to predict a tone of a particular utterance. The tonal machine learning model may be specific to the corresponding user and may have been trained using training data that is specific to the user. Using this type of a machine learning model may increase the system's accuracy as more and more data is collected.

The context detection system may then modify the contextual transcript (e.g., one that already has been generated) to include, with an entry for the first utterance, a corresponding tone. In some embodiments, the context detection system may generate a contextual transcript that includes an entry for the utterance and the corresponding tone. The generated transcript may include other entries for other utterances and their corresponding tone.

In some embodiments, the context detection system may identify a target of the utterance (e.g., a person to whom the utterance is directed). The context detection system may use a directional machine learning model to perform this operation using voice data associated with the previous speaker. In some embodiments, the context detection system may train each machine learning model on devices associated with particular users, while those users are using their devices (e.g., while talking to others).

Various other aspects, features and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data), unless the context clearly dictates otherwise.

BRIEF DESCRIPTION OF THE DRAWINGS

FIG. 2 illustrates a data structure for multiple tonal machine learning models, in accordance with one or more embodiments of this disclosure.

FIG. 5 illustrates an excerpt of an exemplary transcript having tone data, in accordance with one or more embodiments of this disclosure.

FIG. 6 illustrates an excerpt from a contextual transcript, in accordance with one or more embodiments of this disclosure.

DETAILED DESCRIPTION OF THE DRAWINGS

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
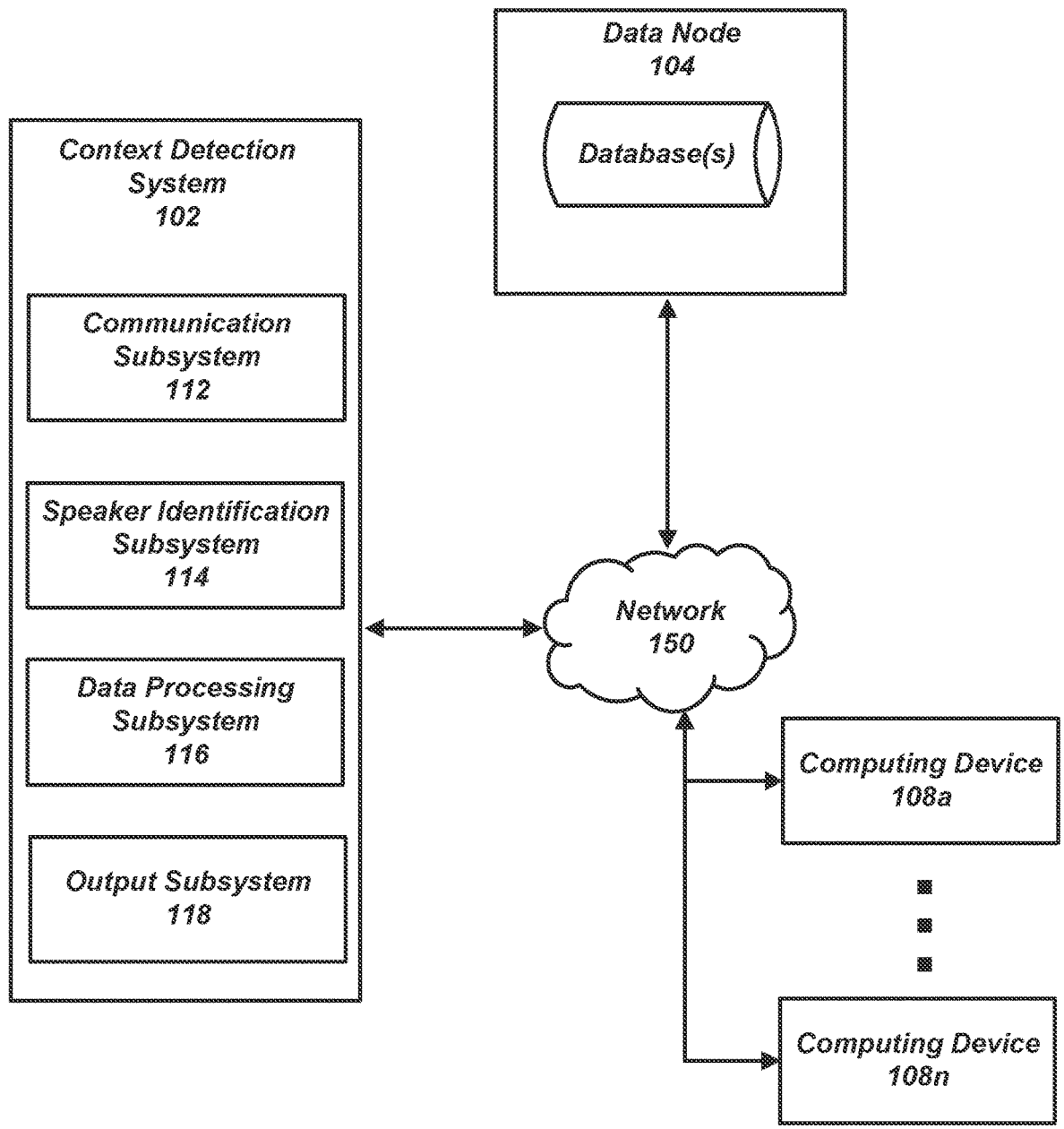
FIG. 1 shows an illustrative system for generating background context of a meeting, in accordance with one or more embodiments of this disclosure.

FIG. 1 is an example of environment 100 for generating background context of a meeting. Environment 100 includes context detection system 102, data node 104, and computing devices 108a-108n. Context detection system 102 may execute instructions for generating the background context of a meeting (e.g., tone and/or direction of each utterance). Context detection system 102 may include software, hardware, or a combination of the two. For example, context detection system 102 may be a physical server or a virtual server that is running on a physical computer system. In some embodiments, context detection system may be a user device or may be similar in hardware/software configuration to computing devices 108a-108n.

Data node 104 may store various data, including different meeting transcripts that have been previously generated. In some embodiments, data node 104 may store one or more machine learning models (e.g., tonal machine learning models for various users). In some embodiments, data node 104 may also be used to train the machine learning models. Data node 104 may include software, hardware, or a combination of the two. For example, data node 104 may be a physical server, or a virtual server that is running on a physical computer system. In some embodiments, context detection system 102 and data node 104 may reside on the same hardware and/or the same virtual server/computing device. Network 150 may be a local area network, a wide area network (e.g., the Internet), or a combination of the two. Computing devices 108a-108n may be end-user computing devices (e.g., desktop computers, laptops, electronic tablets, smart phones and/or other computing devices used by end users).

Context detection system 102 may be configured to receive a meeting transcript or a portion of the meeting transcript. In some embodiments, context detection system 102 may receive the full meeting transcript (e.g., after the meeting has ended). In some embodiments, context detection system 102 may receive portions of the transcript (e.g., one utterance at a time or a particular set of utterances at a time). That is, context detection system 102 may perform its operations on the fly. In yet some embodiments, context detection system 102 may receive an audio or an audio/video file of the meeting or a portion of the audio or audio/video file of the meeting. Context detection system 102 may receive the transcript data (e.g., transcript, portion of the transcript, audio file, audio/video file) from any of computing devices 108a-108n or from a data node 104.

In some embodiments, the context detection system 102 may be configured to receive meeting data (e.g., an audio and/or video) of the meeting as the meeting is occurring. Furthermore, context detection system 102 may be monitoring computing resources that are part of the meeting. For example, context detection system 102 may monitor a chat application available to participants of the meeting. Context detection system 102 may determine one or more messages added to the chat window. Context detection system 102 may determine which utterance the chat message is associated with (e.g., based on the timestamp of the chat) and add the chat to the transcript. The chat may be tagged with an identifier of the utterance to which it was associated. The chat message may include one or more words, phrases, symbols (e.g., emojis) and/or other suitable characters. Context detection system 102 may interpret the content of the message and associate that interpretation with the corresponding utterance.

Context detection system 102 may receive the transcript using communication subsystem 112. Communication subsystem 112 may include software components, hardware components, or a combination of both. For example, communication subsystem 112 may include a network card (e.g., a wireless network card and/or a wired network card) that is coupled with software to drive the card. In some embodiments, communication subsystem 112 may receive a recording of a meeting, which comprises audio data and/or video data from the meeting. Communication subsystem 112 may pass the transcript, or a pointer to the transcript in memory, to speaker identification subsystem 114. In some embodiments, communication subsystem 112 may pass the audio and/or video data to speaker identification subsystem 114.

Speaker identification subsystem 114 may include software components, hardware components, or a combination of both. For example, speaker identification subsystem 114 may include software components that access the transcript in memory and/or storage, and may use one or more processors to perform its operations. Speaker identification subsystem 114 may receive a transcript of a meeting and select the first utterance among a plurality of utterances that were spoken during the meeting. Thus, the received transcript may already include indications of each utterance (i.e., the transcript may have been divided into utterances). For example, the received transcript may be an XML or another structured file or data structure. The file or data structure may include each utterance from the meeting and metadata associated with the utterance. For example, the metadata may include the time range of the utterance (e.g., absolute time or time within the meeting) and each utterance may be stored in chronological order. The metadata may include other information. In some embodiments, the metadata may include fields for storing an identifier of the speaker, tone, and/or direction of the utterance. Those fields may be filled using a process discussed further in this disclosure.

In some embodiments, context detection system 102 may receive an audio or an audio/visual recording of the meeting and may generate a textual transcript of the meeting. For example, speaker identification subsystem 114 may generate, using a speech recognition algorithm, a textual transcript of the recording. For example, speaker identification subsystem 114 may iterate through the audio file or the audio/video file and identify places within the file where the speaker changes. The points within the file where the speaker changes may delineate one utterance from another. Thus, speaker identification subsystem 114 may generate a textual transcript that includes an entry including textual data of each utterance and a corresponding time range within the recording for each utterance. Thus, speaker identification subsystem 114 may generate a data structure of the textual transcript that includes a plurality of fields storing for each utterance the corresponding text and the corresponding time range. As discussed above, other fields may be included in the transcript (e.g., for tone and direction) to which data will be added by the disclosed process.

In some embodiments, the textual transcript may be a structured file (e.g., an XML file as discussed above). Thus, speaker identification subsystem 114 may delineate the text of the transcript organizing the transcript in the XML file by utterance. When the first utterance is selected speaker identification subsystem 114 may perform operations discussed further in this disclosure to identify a tone and or direction of the selected utterance. Speaker identification subsystem 114 may iterate through the transcript in sequential order to select each utterance among the plurality of utterances to identify a tone and/or direction associated with each utterance. In some embodiments, this process may be performed in parallel or substantially in parallel, for example, using multiple processors of a computing device.

To identify the speaker of each utterance, speaker identification subsystem 114 may retrieve a list of participants for the meeting. In some embodiments, speaker identification subsystem 114 may interface with meeting facilitation software (e.g., Microsoft Exchange®) and retrieve the list of meeting participants from that software. Each participant may have an associated voice print stored in, for example, data node 104. For each utterance in the transcript, speaker identification subsystem 114 may extract, using the corresponding time range, a corresponding audio associated with the utterance. For example, speaker identification subsystem 114 may have access to an audio or an audio/visual recording of the meeting. Thus, speaker identification subsystem 114 may retrieve an audio or an audio/visual portion of the recording corresponding to a particular utterance.

Speaker identification subsystem 114 may compare each utterance with voice prints of participants in the list of participants. For example, speaker identification subsystem 114 may transform an audio or audio/visual portion of the recording associated with the utterance into a voice print for the utterance and compare that voice print with voice prints of meeting participants. In some embodiments, where an audio/visual recording of the meeting is available, speaker identification subsystem 114 may use a visual recording of the user to identify that user (e.g., speaker identification subsystem 114 may use face recognition in addition or instead of voice recognition). Speaker identification subsystem 114 may match, based on comparing each utterance with the voice prints of the participants in the meeting, each utterance with a corresponding participant. In some embodiments, speaker identification subsystem 114 may use a visual recording of the speaker to identify the speaker (e.g., using face recognition).

Speaker identification subsystem 114 may update a data structure corresponding to the transcript to include an identifier of the corresponding participant. For example, the data structure may be an XML file or another suitable data structure. Speaker identification subsystem 114 may add an identifier of the speaker to the data structure. The identifier may be a name of the speaker, a number, or another suitable identifier. Thus, the data structure, after this operation, may include the utterance, the time period within the meeting of the utterance and an identifier of the speaker. When the speaker of the particular utterance is identified the identification data and the transcript may be passed to data processing subsystem 116. In some embodiments, a notification is passed to data processing subsystem 116. Data processing subsystem 116 may include software components, hardware components, or a combination of both. For example, data processing subsystem 116 may include software components that accesses data in memory and/or storage, and may use one or more processors to perform its operations.

Data processing subsystem 116 may select, from a plurality of machine learning models associated with the plurality of users, a first machine learning model associated with the user. Each machine learning model may have been trained, using a training set of utterances of a corresponding user, to determine a corresponding tone associated with a particular utterance. Thus, these machine learning models may be referred to as tonal machine learning models. Data processing subsystem 116 may have access to a plurality of tonal machine learning models stored, for example, on data node 104. As discussed above, each tonal machine learning model may be associated with a particular user. Thus, data processing subsystem 116 may use a user identifier associated with each utterance (e.g., as stored within a data structure such as an XML file) to identify the correct tonal machine learning model for that speaker.

FIG. 2 illustrates a data structure 200 for storing multiple tonal machine learning models. Fields 203 may store user identifiers for various users that have associated tonal machine learning models. Fields 206 may store tonal machine learning models identifiers corresponding to the user identifiers in fields 203. In some embodiments, fields 203 may include links to be used to use a particular machine learning model. For example, an application programming interface (API) may be generated for inputting data to a machine learning model. The API may enable a command to be generated that includes a link to the correct tonal machine learning model. The command may also include utterance data to be processed by the machine learning model. Thus, data processing subsystem 116 may look up the link for a corresponding user within a data structure illustrated in FIG. 2 and generate a command that includes a link to the correct machine learning model. The command may also include utterance data (e.g., one or more vectors to be described later in this disclosure). Fields 209 include corresponding identifier for directional machine learning models associated with corresponding user identifiers in fields 203. Directional machine learning models are described later in this disclosure.

In some embodiments, each tonal machine learning model may reside on a device associated with a user (e.g., on a smartphone of the user). Having the tonal machine learning model on a user device enables the machine learning model to be constantly trained on that user device. Thus, data processing subsystem 116 may retrieve that tonal machine learning model when it is required to be used. Data processing subsystem 116 may retrieve a first device address associated with a first device of a first user. For example, data processing subsystem 116 may store device addresses for user devices where corresponding tonal machine learning models are stored. The device address may be recorded when the device is registered with context detection system 102. When the device address is retrieved, data processing subsystem 116 may transmit, to the first device address, a command for retrieving the tonal machine learning model. The command may instruct the device of the user to transmit a tonal machine learning model to the requesting device. In some embodiments, the command may include an identifier associated with the user. In response to the command, data processing subsystem 116 may receive the tonal machine learning model associated with the particular user.

In some embodiments, when data processing subsystem 116 requests a tonal machine learning model from a user device, data processing subsystem 116 may include, with a command, a version identifier of a tonal machine learning model that data processing subsystem 116 already stores. Thus, the user device may transmit back, instead of the tonal machine learning model, an indication that the model that data processing subsystem 116 stores is identical to the model on the user device. Data processing subsystem 116 may then use the already existing model.

In some embodiments, data processing subsystem 116 may use the tonal machine learning model directly from the device. Instead of requesting and receiving the machine learning model, data processing subsystem 116 may transmit a command to the tonal machine learning model a request for a tone associated with a particular utterance. Together with the command, data processing subsystem 116 may transmit, to the user device where the tonal machine learning model resides, one or more vector representations associated with the utterance. In response, data processing subsystem 116 may receive one or more tone identifiers. In some embodiments, together with the one or more tone identifiers, data processing subsystem 116 may receive probabilities associated with those tone identifiers.

Figure 3:
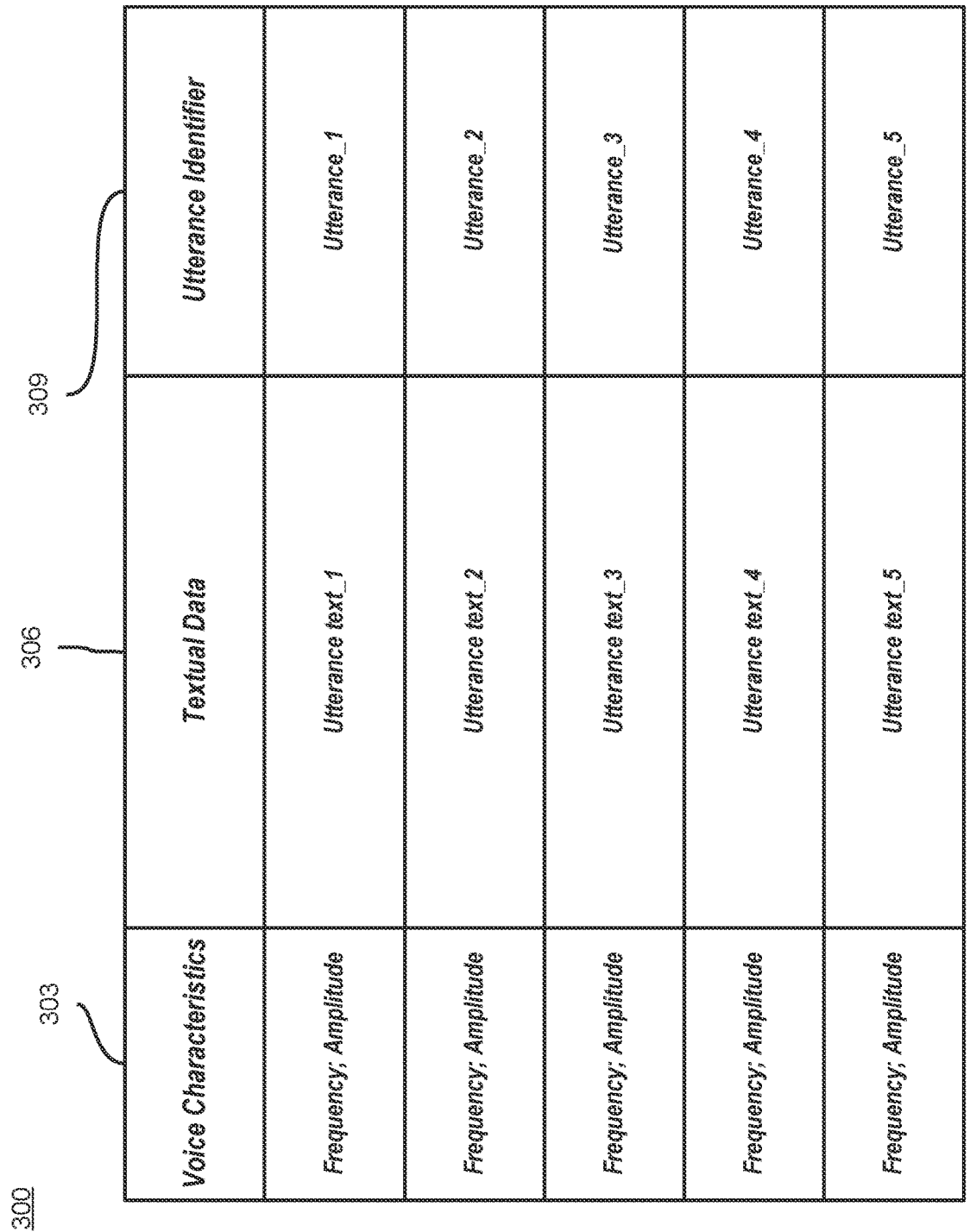
FIG. 3 illustrates a table that includes voice characteristics and associated machine learning models, in accordance with one or more embodiments of this disclosure.

Data processing subsystem 116 may input utterance data associated with the first utterance into the first machine learning model to obtain a tone associated with the first utterance. The utterance data may include voice characteristics associated with the first utterance and textual data of the first utterance. FIG. 3 illustrates table 300 exemplifies utterance data that may be input into the tonal machine learning model. Column 303 stores voice characteristics that include the frequency and amplitude associated with the utterance. Although, frequency and amplitude are shown in column 303 other voice characteristics may be included. Column 306 may store the text of the utterance. Column 309 may store an identifier associated with each utterance. For example, the identifier may be based on the order of the utterance within the meeting. In some embodiments, the identifier may be a time period during which the utterance was uttered during the meeting. Table 300 may include other columns, for example, an audio clip associated with the utterance.

Data processing subsystem 116 may transform at least a portion of the utterance data into a vector representation and input the vector representation in the machine learning model to obtain a tone associated with the utterance (e.g., the tonal machine learning model). Thus, data processing subsystem 116 may generate, from a portion of a recording associated with a given utterance, a plurality of voice characteristics for the utterance, the plurality of voice characteristics including an amplitude and a frequency. Data processing subsystem 116 may perform this operation using an algorithm that is able to extract amplitude and frequency values from audio recordings. Data processing subsystem 116 may generate an input vector for the particular utterance. The input vector may include the amplitude as the frequency. The vector representation may be generated by another machine learning model or another algorithm. Furthermore, other data may be part of the vector representation. For example, the textual data of the utterance may be transformed into a portion of the vector representation. Thus, the input vector may be assigned to the utterance data.

In some embodiments, data processing subsystem may use two vector representations for utterance data. Thus, data processing subsystem 116 may convert a textual representation of the first utterance into a first vector representation and convert an audio data associated with the first utterance into a second vector representation. The data processing subsystem may then assign the first vector representation and the second vector representation to the utterance data. Data processing subsystem 116 may then receive from the tonal machine learning model a tone associated with the utterance. In some embodiments, data processing subsystem 116 may receive a plurality of tones with a plurality of probabilities. Thus, data processing subsystem 116 may select one or more tones having associated highest probabilities.

Figure 4:
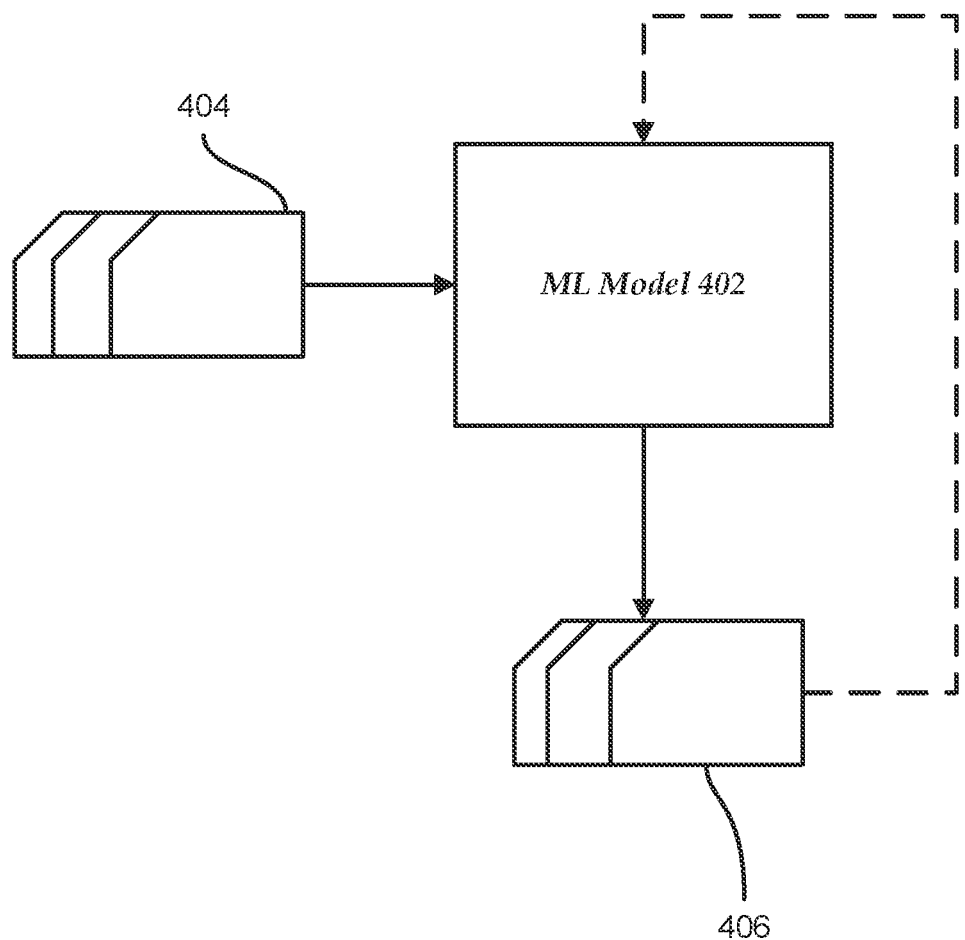
FIG. 4 illustrates an exemplary machine learning model, in accordance with one or more embodiments of this disclosure.

FIG. 4 illustrates an exemplary machine learning model. Machine learning model 402 may take input 404 (e.g., a vector representing particular utterance data) and may output a tone of voice 406. The tone may be incorporated into the modified contextual transcript of the meeting along with its corresponding utterance entry. The output parameters may be fed back to the machine learning model as input to train the machine learning model (e.g., alone or in conjunction with user indications of the accuracy of outputs, labels associated with the inputs, or with other reference feedback information). The machine learning model may update its configurations (e.g., weights, biases, or other parameters) based on the assessment of its prediction (e.g., of an information source), and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function, which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

When data processing subsystem 116 receives the tone associated with the utterance, data processing subsystem 116 may modify a contextual transcript to include the tone for each utterance. For example, data processing subsystem 116 may modify an entry within the context transcript associated with the utterance that is being processed to include the determined tone. In some embodiments, multiple tones may be included (e.g., when probabilities for two or more highest tones are within a threshold value). FIG. 5 illustrates a data structure 500 representing a portion of a contextual transcript. Column 503 may include an utterance identifier. For example, the utterance identifier may be a time range within the meeting that the utterance was spoken. In another example, utterance identifier may be based on the position of the utterance within the meeting. For example, the first utterance uttered at the meeting may have an identifier of one, the next an identifier of two, etc. Column 506 may include a speaker identifier. The speaker identifier may be the name of the person who spoke the utterance or another suitable identifier. Column 509 may include the text of each utterance and column 512 may include the tone generated as described above.

In some embodiments, tonal machine learning models may be trained at a user device (e.g., continuously trained based on user's interaction with the user device). Thus, data processing subsystem 116 may store the tonal machine learning model on a device associated with a first user, and continuously train the tonal machine learning model as the first user interacts with the user device. In some embodiments, data processing subsystem 116 may, periodically, cause the tonal machine learning model to be transmitted from the user device to context detection system 102 and/or data node 104. For example, data processing subsystem 116 may issue a command to transmit the tonal machine learning model. In another example, the user device may transmit the tonal machine learning model with a certain frequency (e.g., hourly, daily, weekly, etc.).

In some embodiments, data processing subsystem 116 may determine a direction of each utterance. That is, data processing subsystem 116 may determine who the speaker is addressing with the utterance. For example, data processing subsystem 116 may determine, using a second machine learning model sometimes referred to as a directional machine learning model, that the first utterance is a response to a previous utterance. Thus, data processing subsystem 116 may identify a speaker of the previous utterance and modify the contextual transcript to include the speaker of the previous utterance as a direction of the first utterance.

Data processing subsystem 116 may perform the detection using the following operations. Data processing subsystem 116 may select a particular utterance and determine, using a second machine learning model, that the first utterance is a response to a previous utterance. For example, data processing subsystem 116 may generate a vector representation of the text of the particular utterance. In addition, data processing subsystem 116 may generate a vector representation of the text of each utterance within the meeting spoken prior to the particular utterance. In some embodiments, data processing subsystem 116 may not need to generate vector representations of the other utterances because the vector representations were already generated when those utterances were processed, and the vector representations were already stored.

When the vector representations are generated, a directional machine learning model may input the vector representation of the utterance being currently processed and a vector representation of one of the utterances spoken earlier in the meeting. The directional machine learning model may output an indication whether the utterance being currently processed is a response to a previously spoken utterance. Thus, the directional machine learning model may have been trained to output a determination of whether one utterance is a response to another utterance. In some embodiments, a particular utterance may be a response to multiple utterances spoken earlier in the meeting. For example, if two speakers had a similar question, the respondent may respond to both questions with the same answer. Thus, data processing subsystem 116 may select, in turn or substantially in parallel using multiple processors, each vector representation of a corresponding previously spoken utterance and the vector representation of the utterance being currently processed and input each pair into the directional machine learning model. The directional machine learning model may then output a Boolean value (e.g., True or False) indicating whether one utterance is a response to another utterance.

Data processing subsystem 116 may receive the output and identify one or more instances where, for a pair of utterances, the directional machine learning model determined that the utterance being currently processed is a response to an earlier spoken utterance. If one or more pairs of utterances is associated with a positive response from the directional machine learning model (i.e., one utterance in a pair is a response to the other utterance), data processing subsystem 116 may update the contextual transcript to include the direction of the utterance. The direction of the utterance may be a particular person within the meeting, a particular group within the meeting, and/or a particular utterance within the transcript. Thus, the context transcript may include in the direction field an identifier of a speaker, a group, or an identifier of an utterance. The speaker identifier may be associated with the speaker of the utterance where the output of the directional machine learning model was true.

FIG. 6 illustrates table 600 that is an excerpt from a contextual transcript. Column 603 may include an utterance identifier. For example, the utterance identifier may be a time range within the meeting that the utterance was spoken. In another example, utterance identifier may be based on the position of the utterance within the meeting. For example, the first utterance uttered at the meeting may have an identifier of one, the next an identifier of two, etc. Column 606 may include a speaker identifier. The speaker identifier may be the name of the person who spoke the utterance or another suitable identifier. Column 609 may include the text of each utterance and column 612 may include the tone generated as described above. Column 615 may include a direction of the utterance as discussed in this disclosure.

Figure 7:
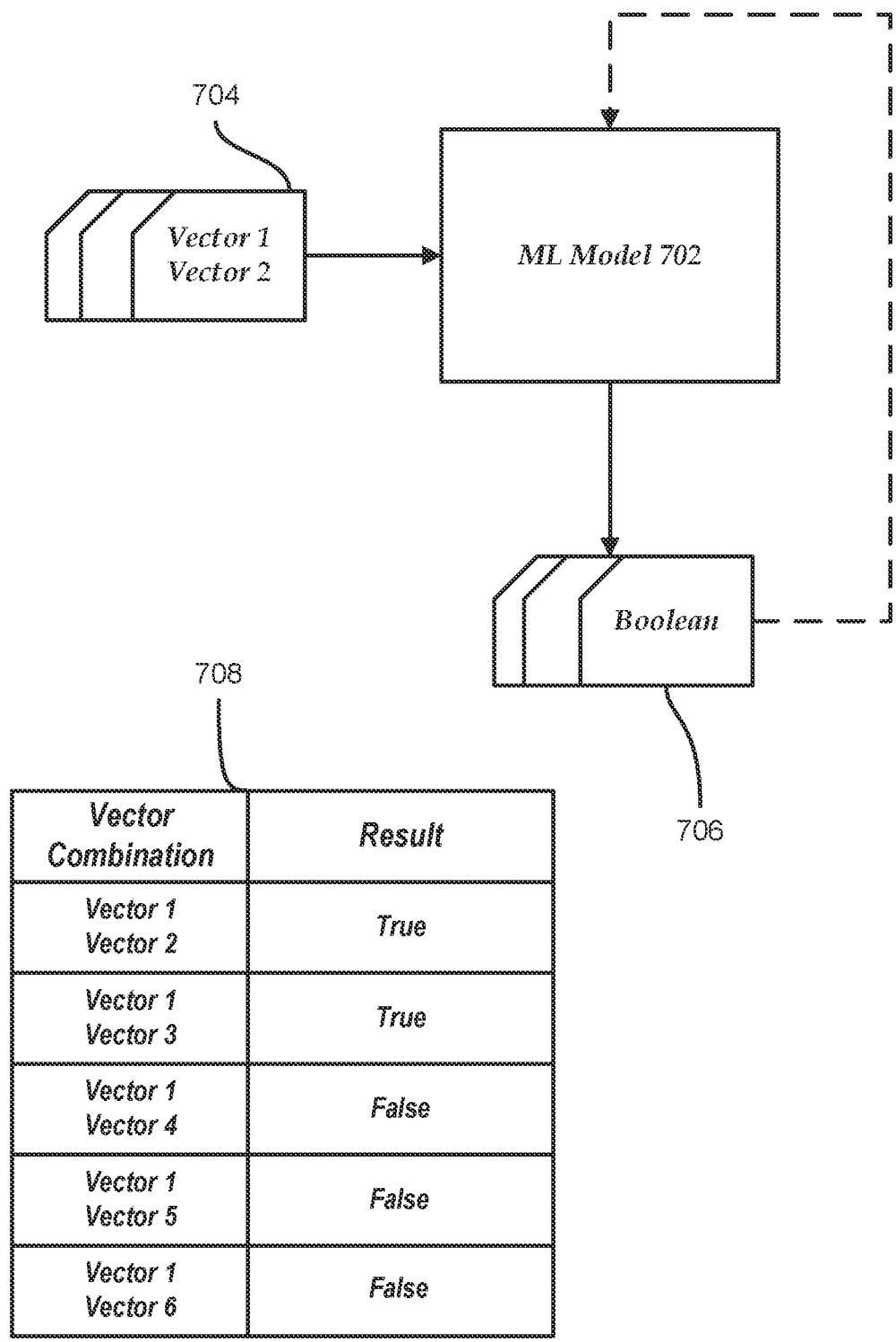
FIG. 7 illustrates a directional machine learning model operation, in accordance with one or more embodiments of this disclosure.

FIG. 7 illustrates directional machine learning model operation. Input 704 may include a pair of vectors (e.g., generated as described above). Directional machine learning model 702 may be a machine learning model described in relation to FIG. 4 and may accept input 704. Directional machine learning model may output a Boolean value 706, which may indicate if an utterance associated with vector 1 of input 704 is a response to utterance associated with vector 2 of input 704. The same process may be repeated for other utterances in the transcript. Table 708 illustrates the vector combinations and the result output by directional machine learning model 702, where the value of "True" corresponds to an utterance (e.g., utterance associated with Vector 1) being a response to another utterance (e.g., utterance associated with Vector 2), and the value of "False" corresponds to an utterance (e.g., utterance associated with Vector 1) not being a response to another utterance (e.g., utterance associated with Vector 4).

In some embodiments, the contextual transcript is passed to output subsystem 118. Output subsystem 118 may include software components, hardware components, or a combination of both. For example, output subsystem 118 may include software components that accesses data in memory and/or storage, and may use one or more processors to perform its operations. Output subsystem 118 may output the contextual transcript to one or more computing devices 108a-108n and/or to data node 104. In some embodiments, output subsystem 118 may transmit the contextual transcript or a link to the contextual transcript over an electronic mail (e-mail) or over another electronic communication method.

Computing Environment

Figure 8:
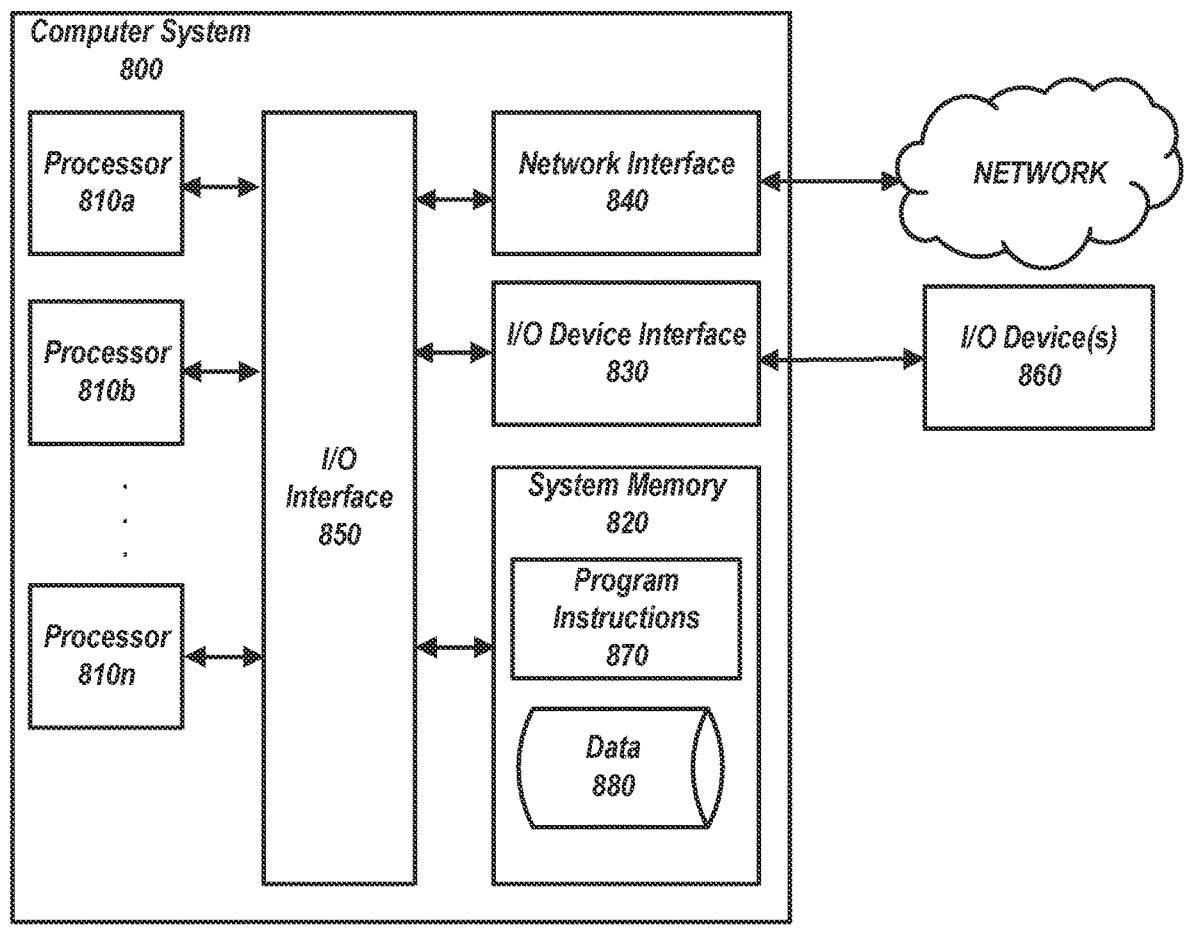
FIG. 8 shows an example computing system that may be used, in accordance with one or more embodiments of this disclosure.

FIG. 8 shows an example computing system that may be used in accordance with some embodiments of this disclosure. In some instances, computing system 800 is referred to as a computer system. A person skilled in the art would understand that those terms may be used interchangeably. The components of FIG. 8 may be used to perform some or all operations discussed in relation with FIGS. 1-7. Furthermore, various portions of the systems and methods described herein may include or be executed on one or more computer systems similar to computing system 800. Further, processes and modules described herein may be executed by one or more processing systems similar to that of computing system 800.

Computing system 800 may include one or more processors (e.g., processors 810a-810n) coupled to system memory 820, an input/output (I/O) device interface 830, and a network interface 840 via an input/output (I/O) interface 850. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 800. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 820). Computing system 800 may be a uni-processor system including one processor (e.g., processor 810a), or a multi-processor system including any number of suitable processors (e.g., 810a-810n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 800 may include a plurality of computing devices (e.g., distributed computer systems) to implement various processing functions.

I/O device interface 830 may provide an interface for connection of one or more I/O devices 860 to computer system 800. I/O devices may include devices that receive input (e.g., from a user) or output information (e.g., to a user). I/O devices 860 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 860 may be connected to computer system 800 through a wired or wireless connection. I/O devices 860 may be connected to computer system 800 from a remote location. I/O devices 860 located on remote computer systems, for example, may be connected to computer system 800 via a network and network interface 840.

Network interface 840 may include a network adapter that provides for connection of computer system 800 to a network. Network interface 840 may facilitate data exchange between computer system 800 and other devices connected to the network. Network interface 840 may support wired or wireless communication. The network may include an electronic communication network, such as the Internet, a local area network (LAN), a wide area network (WAN), a cellular communications network, or the like.

System memory 820 may be configured to store program instructions 870 or data 880. Program instructions 870 may be executable by a processor (e.g., one or more of processors 810a-810n) to implement one or more embodiments of the present techniques. Instructions 870 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site, or distributed across multiple remote sites and interconnected by a communication network.

System memory 820 may include a tangible program carrier having program instructions stored thereon. A tangible program carrier may include a non-transitory computer readable storage medium. A non-transitory computer readable storage medium may include a machine readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 820 may include a non-transitory computer readable storage medium that may have program instructions stored thereon that are executable by a computer processor (e.g., one or more of processors 810a-810n) to cause the subject matter and the functional operations described herein. A memory (e.g., system memory 820) may include a single memory device and/or a plurality of memory devices (e.g., distributed memory devices).

I/O interface 850 may be configured to coordinate I/O traffic between processors 810a-810n, system memory 820, network interface 840, I/O devices 860, and/or other peripheral devices. I/O interface 850 may perform protocol, timing, or other data transformations to convert data signals from one component (e.g., system memory 820) into a format suitable for use by another component (e.g., processors 810a-810n). I/O interface 850 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 800, or multiple computer systems 800 configured to host different portions or instances of embodiments. Multiple computer systems 800 may provide for parallel or sequential processing/execution of one or more portions of the techniques described herein.

Those skilled in the art will appreciate that computer system 800 is merely illustrative, and is not intended to limit the scope of the techniques described herein. Computer system 800 may include any combination of devices or software that may perform or otherwise provide for the performance of the techniques described herein. For example, computer system 800 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 800 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 9:
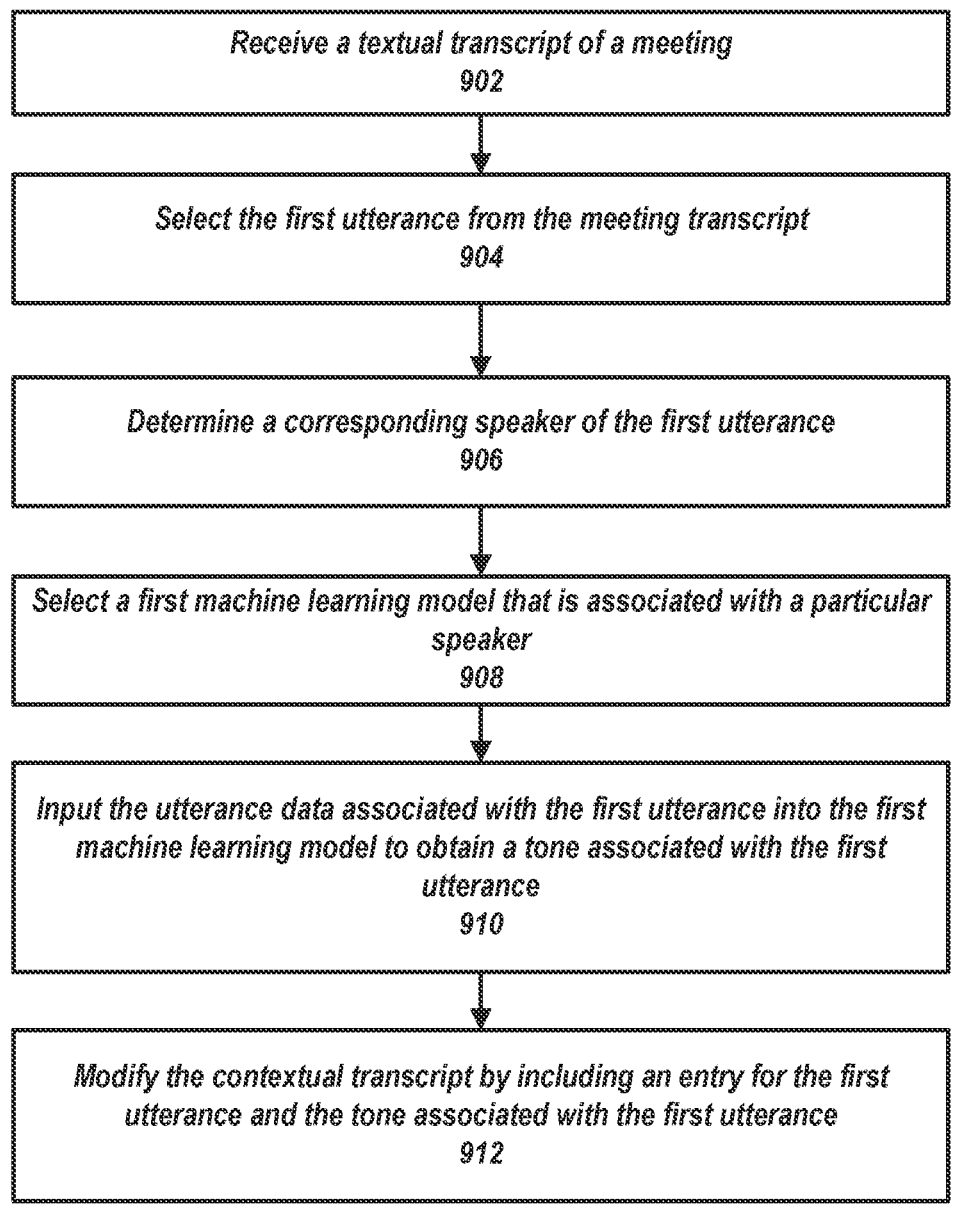
FIG. 9 is a flowchart of operations for generating the background context of a meeting, in accordance with one or more embodiments of this disclosure.

FIG. 9 is a flowchart 900 of operations for improving documents. The operations of FIG. 9 may use components described in relation to FIG. 8. In some embodiments, context detection system 102 may include one or more components of computer system 800. At 902, context detection system 102 receives a textual transcript of a meeting. For example, the context detection system may receive the textual transcript from a data node 104 from one of computing devices 108a-108n. Context detection system 102 may receive the textual transcript over network 150 using network interface 840.

At 904, context detection system 102 selects the first utterance from the meeting transcript. For example, context detection system 102 may iterate through each utterance within the textual transcript and select the first utterance (e.g., chronologically) within the textual transcript. Context detection system 102 may use one or more processors 810a, 810b, and/or 810n to perform the selection.

At 906, context detection system 102 determines a corresponding speaker of the first utterance. For example, context detection system 102 may, using one or more processors 810a-810n, execute a voice detection algorithm on the first utterance. At 908, context detection system 102 selects a first machine learning model that is associated with a particular speaker. Context detection system 102 may retrieve the selected first machine learning model from system memory 820 (e.g., as part of data 880).

At 910, context detection system 102 inputs the utterance data associated with the first utterance into the first machine learning model to obtain a tone associated with the first utterance. The machine learning model may correspond to the specific speaker. The machine learning model may return a tone and, in some embodiments, a probability for that tone. For example, the machine learning model may reside on the same physical or logical computing device as context detection system 102 resides on. Thus, context detection system 102 may use one or more processors (e.g., processor 810a) to input a discussed vector representation into the machine learning model. In some embodiments, the machine learning model may reside on another computing device (e.g., on data node 104). Thus, context detection system 102 may transmit the data to that node.

At 912, context detection system 102 modifies the contextual transcript by including an entry for the first utterance and the tone associated with the first utterance. Thus, context detection system 102 may use one or more processors (e.g., processor 810*a*) to perform this operation and store the modified transcript in memory, such as system memory 820 (e.g., as part of data 880).

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving a textual transcript of a meeting, wherein the textual transcript comprises a plurality of utterances for a plurality of users attending the meeting; selecting a first utterance of the plurality of utterances; determining, for the first utterance of the plurality of utterances, a user of the plurality of users associated with the first utterance; selecting, from a plurality of machine learning models associated with the plurality of users, a first machine learning model associated with the user, wherein each machine learning model was trained, using a training set of utterances of a corresponding user, to determine a corresponding tone associated with a particular utterance; inputting utterance data associated with the first utterance into the first machine learning model to obtain a tone associated with the first utterance, wherein the utterance data comprises voice characteristics associated with the first utterance and textual data of the first utterance; and modifying a contextual transcript comprising an entry for the first utterance with the tone associated with the first utterance.

2. Any of the proceeding embodiments, further comprising: receiving a recording of the meeting, wherein the recording comprises audio data for the meeting; generating, using a speech recognition algorithm, the textual transcript of the recording, wherein the textual transcript comprises corresponding text of each utterance and a corresponding time range within the recording for each utterance; and generating a data structure of the textual transcript, wherein the data structure comprises a plurality of fields storing for each utterance the corresponding text and the corresponding time range.

3. Any of the proceeding embodiments, further comprising: retrieving a list of participants for the meeting; for each utterance of the plurality of utterances, extracting, using the corresponding time range, corresponding audio associated with each utterance; comparing each utterance with voice prints of participants in the list of participants; matching, based on comparing each utterance with the voice prints of the participants in the list of participants, each utterance with a corresponding participant; and updating the data structure to include an identifier of the corresponding participant.

4. Any of the proceeding embodiments, further comprising: generating, from a portion of a recording associated with the first utterance, a plurality of voice characteristics for the first utterance, the plurality of voice characteristics comprising an amplitude and a frequency; generating an input vector for the first utterance, the input vector comprising the amplitude as the frequency; and assigning the input vector to the utterance data.

5. Any of the proceeding embodiments, further comprising: converting a textual representation of the first utterance into a first vector representation; converting an audio data associated with the first utterance into a second vector representation; and assigning the first vector representation and the second vector representation to the utterance data.

6. Any of the proceeding embodiments, wherein selecting the first machine learning model associated with the user comprises: retrieving a first device address associated with a first device of a first user; transmitting, to the first device address, a command to the first device of the first user, wherein the command instructs the first device of the user to transmit a first tonal machine learning model, wherein the first tonal machine learning model is associated with the first user; and receiving the first tonal machine learning model from the first device.

7. Any of the proceeding embodiments, further comprising: determining, using a second machine learning model, that the first utterance is a response to a previous utterance; identifying a speaker of the previous utterance; and modifying the contextual transcript to include the speaker of the previous utterance as a direction of the first utterance.

8. Any of the proceeding embodiments, further comprising: storing the first machine learning model on a first device associated with a first user; continuously training the first machine learning model as the first user interacts with the first device associated with the first user; and periodically, causing the first machine learning model to be transmitted from the first device associated with the first user.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

12. A system comprising cloud-based circuitry for performing any of embodiments 1-8.

What is claimed is:
1. A system for generating a contextual meeting transcript, the system comprising:
  one or more processors; and
  a non-transitory computer-readable storage medium storing instructions, which when executed by the one or more processors cause the one or more processors to:

generate a textual transcript of a recording of a meeting, wherein the textual transcript comprises a plurality of utterances for a plurality of users attending the meeting;

match, using voice data of each of the plurality of users, each utterance of the plurality of utterances with a corresponding user of the plurality of users;

select an utterance of the plurality of utterances;

generate, from a corresponding portion of the recording associated with the utterance of the plurality of utterances, a plurality of voice characteristics for the utterance;

generate an input vector for the utterance, the input vector comprising values generated based on the plurality of voice characteristics and a portion of the textual transcript associated with the utterance;

select a tonal machine learning model associated with a user corresponding to the utterance;

input the input vector into the tonal machine learning model to obtain a tone associated with the utterance, wherein the tonal machine learning model was trained with training data specific to the user to predict various tones specific to the user;

generate a contextual transcript comprising an entry for the utterance of the plurality of utterances, wherein the entry comprises corresponding textual data associated with the utterance and metadata that includes a corresponding tone associated with the utterance;

determine, using a directional machine learning model, that a first utterance is a response to a previous utterance;

identify a speaker of the previous utterance; and modify the contextual transcript to include the speaker of the previous utterance as a direction of the first utterance.

2. The system of claim 1, wherein the instructions cause the one or more processors to:

transmit a first command to a device associated with a first user to store a first tonal machine learning model on the device associated with the first user;

transmit a second command to the device associated with the first user to continuously train the first tonal machine learning model as the first user interacts with the device associated with the first user; and periodically, cause the first tonal machine learning model to be transmitted from the device associated with the first user.

3. The system of claim 1, wherein the instructions for selecting the tonal machine learning model associated with the user corresponding to the utterance, when executed by the one or more processors, further cause the one or more processors to:

retrieve a first device address associated with a first device of a first user;

transmit, to the first device address, a command to transmit a first tonal machine learning model, wherein the first tonal machine learning model is associated with the first user; and receive the first tonal machine learning model from the first device.

4. A method comprising:

receiving a textual transcript of a meeting, wherein the textual transcript comprises a plurality of utterances for a plurality of users attending the meeting;

selecting a first utterance of the plurality of utterances;

determining, for the first utterance of the plurality of utterances, a user of the plurality of users associated with the first utterance;

selecting, from a plurality of machine learning models associated with the plurality of users, a first machine learning model associated with the user, wherein each machine learning model was trained, using a training set of utterances of a corresponding user, to determine a corresponding tone associated with a particular utterance;

inputting utterance data associated with the first utterance into the first machine learning model to obtain a tone associated with the first utterance, wherein the utterance data comprises voice characteristics associated with the first utterance and textual data of the first utterance;

modifying a contextual transcript comprising an entry for the first utterance with the tone associated with the first utterance;

determining, using a second machine learning model, that the first utterance is a response to a previous utterance;

identifying a speaker of the previous utterance; and modifying the contextual transcript to include the speaker of the previous utterance as a direction of the first utterance.

5. The method of claim 4, further comprising:

receiving a recording of the meeting, wherein the recording comprises audio data for the meeting;

generating, using a speech recognition algorithm, the textual transcript of the recording, wherein the textual transcript comprises corresponding text of each utterance and a corresponding time range within the recording for each utterance; and generating a data structure of the textual transcript, wherein the data structure comprises a plurality of fields storing for each utterance the corresponding text and the corresponding time range.

6. The method of claim 5, further comprising:

retrieving a list of participants for the meeting;

for each utterance of the plurality of utterances, extracting, using the corresponding time range, corresponding audio associated with each utterance;

comparing each utterance with voice prints of participants in the list of participants;

matching, based on comparing each utterance with the voice prints of the participants in the list of participants, each utterance with a corresponding participant; and updating the data structure to include an identifier of the corresponding participant.

7. The method of claim 4, further comprising:

generating, from a portion of a recording associated with the first utterance, a plurality of voice characteristics for the first utterance, the plurality of voice characteristics comprising an amplitude and a frequency;

generating an input vector for the first utterance, the input vector comprising the amplitude as the frequency; and assigning the input vector to the utterance data.

8. The method of claim 4, further comprising:

converting a textual representation of the first utterance into a first vector representation;

converting an audio data associated with the first utterance into a second vector representation; and assigning the first vector representation and the second vector representation to the utterance data.

9. The method of claim 4, wherein selecting the first machine learning model associated with the user comprises:

retrieving a first device address associated with a first device of a first user;

transmitting, to the first device address, a command to the first device of the first user, wherein the command instructs the first device of the user to transmit a first tonal machine learning model, wherein the first tonal machine learning model is associated with the first user; and receiving the first tonal machine learning model from the first device.

10. The method of claim 4, further comprising:

storing the first machine learning model on a first device associated with a first user;

continuously training the first machine learning model as the first user interacts with the first device associated with the first user; and periodically, causing the first machine learning model to be transmitted from the first device associated with the first user.

11. A non-transitory, computer-readable medium for generating a contextual meeting transcript, storing instructions that, when executed by one or more processors, cause the one or more processors to perform operations comprising:

receiving a textual transcript of a meeting, wherein the textual transcript comprises a plurality of utterances for a plurality of users attending the meeting;

selecting a first utterance of the plurality of utterances;

determining, for the first utterance of the plurality of utterances, a user of the plurality of users associated with the first utterance;

selecting, from a plurality of machine learning models associated with the plurality of users, a first machine learning model associated with the user, wherein each machine learning model was trained, using a training set of utterances of a corresponding user, to determine a corresponding tone associated with a particular utterance;

inputting utterance data associated with the first utterance into the first machine learning model to obtain a tone associated with the first utterance, wherein the utterance data comprises voice characteristics associated with the first utterance and textual data of the first utterance;

modifying a contextual transcript comprising an entry for the first utterance with the tone associated with the first utterance;

determining, using a second machine learning model, that the first utterance is a response to a previous utterance;

identifying a speaker of the previous utterance; and modifying the contextual transcript to include the speaker of the previous utterance as a direction of the first utterance.

12. The non-transitory, computer-readable medium of claim 11, wherein the instructions further cause the one or more processors to perform operations comprising:

receiving a recording of the meeting, wherein the recording comprises audio data for the meeting;

generating, using a speech recognition algorithm, the textual transcript of the recording, wherein the textual transcript comprises corresponding text of each utterance and a corresponding time range within the recording for each utterance; and generating a data structure of the textual transcript, wherein the data structure comprises a plurality of fields storing for each utterance the corresponding text and the corresponding time range.

13. The non-transitory, computer-readable medium of claim 12, wherein the instructions further cause the one or more processors to perform operations comprising:

retrieving a list of participants for the meeting;

for each utterance of the plurality of utterances, extracting, using the corresponding time range, corresponding audio associated with each utterance;

comparing each utterance with voice prints of participants in the list of participants;

matching, based on comparing each utterance with the voice prints of the participants in the list of participants, each utterance with a corresponding participant; and updating the data structure to include an identifier of the corresponding participant.

14. The non-transitory, computer-readable medium of claim 11, wherein the instructions further cause the one or more processors to perform operations comprising:

generating, from a portion of a recording associated with the first utterance, a plurality of voice characteristics for the first utterance, the plurality of voice characteristics comprising an amplitude and a frequency;

generating an input vector for the first utterance, the input vector comprising the amplitude as the frequency; and assigning the input vector to the utterance data.

15. The non-transitory, computer-readable medium of claim 11, wherein the instructions further cause the one or more processors to perform operations comprising:

convert a textual representation of the first utterance into a first vector representation;

convert an audio data associated with the first utterance into a second vector representation; and assign the first vector representation and the second vector representation to the utterance data.

16. The non-transitory, computer-readable medium of claim 11, wherein the instructions for selecting the first machine learning model associated with the user further cause the one or more processors to perform operations comprising:

retrieving a first device address associated with a first device of a first user;

transmitting, to the first device address, a command to the first device of the first user, wherein the command instructs the first device of the user to transmit a first tonal machine learning model, wherein the first tonal machine learning model is associated with the first user; and receiving the first tonal machine learning model from the first device.

17. The non-transitory, computer-readable medium of claim 11, wherein the instructions further cause the one or more processors to perform operations comprising:

storing the first machine learning model on a first device associated with a first user;

continuously training the first machine learning model as the first user interacts with the first device associated with the first user; and periodically, causing the first machine learning model to be transmitted from the first device associated with the first user.

\* \* \* \* \*